United States Patent [19]

Pronovost

[11] 3,746,863

[45] July 17, 1973

[54] LIGHT CURTAIN CONTROL FOR A SWITCH

[75] Inventor: Jacques O. Pronovost, Guelph, Ontario, Canada

[73] Assignee: Exotron Industries, Ltd., Guelph, Ontario, Canada

[22] Filed: Mar. 15, 1972

[21] Appl. No.: 234,953

[52] U.S. Cl. ............ 250/208, 250/83.3 H, 250/221, 340/258 B

[51] Int. Cl. .... G01t 1/16, G06m 7/00, G08b 13/00

[58] Field of Search ....................... 250/221, 83.3 H, 250/208; 340/258 B

[56] References Cited

UNITED STATES PATENTS

| | | | |
|---|---|---|---|
| 1,887,209 | 11/1932 | Lucas | 250/221 X |
| 2,900,521 | 8/1959 | Eames | 250/221 X |
| 3,360,654 | 12/1967 | Muller | 250/221 |
| 3,370,285 | 2/1968 | Cruse et al. | 340/258 B |

FOREIGN PATENTS OR APPLICATIONS

| | | | |
|---|---|---|---|
| 1,379,069 | 10/1964 | France | 250/221 |

*Primary Examiner*—James W. Lawrence
*Assistant Examiner*—T. N. Grigsby
*Attorney*—Cullen, Settle, Sloman & Cantor

[57] ABSTRACT

A switch controlled by a light curtain formed of a large number of rapid, intermittent, sequentially flashed, light beams which, when interrupted, actuate the switch. The light beams are flashed back and forth between a pair of spaced apart columns each having a row of alternating light transmitters and receivers so that a beam of light from one transmitter of one column is received by an opposing receiver in the second column, in turn causing the next transmitter in the second column to send a beam of light to the next receiver in the first column, and so on back and forth to the ends of the columns and then repeating the same cycle again. When any of the beams of light is interrupted, as by inserting a physical object in its path, the switch is actuated. By arranging the transmitters and receivers, in each column, in pairs (i.e., two transmitters, then two receivers, etc.) and connecting them into odd and even, sequentially operated, rows in each column, the light beams may be relatively wide or non-sharply focused, so that the operation of the system, is relatively uneffected by misalignment.

7 Claims, 8 Drawing Figures

Patented July 17, 1973 3,746,863

3 Sheets-Sheet 2

TRANSMITTER

RECEIVER

RECEIVER POWER SUPPLY

TRANSMITTER POWER SUPPLY

CONTROL CIRCUIT

LIGHT CURTAIN CONTROL FOR A SWITCH

BACKGROUND OF INVENTION

The device herein is generally similar in nature to the so-called "electric eye" light beam controls used for switches. In these conventional devices, a light transmitter shines a beam across a space or gap to a receiver and whenever the light beam is blocked or interrupted, the receiver causes the actuation of the switch which in turn may operate or deactivate a machine, open or close doors, etc., depending upon how used. The types of "electric eye" controls conventionally available are generally useful for static or fixed conditions, such as for positioning in a doorway where once the light is secured to a jamb and focused upon the fixed receiver, no relative movement between these two parts need be expected.

Attempts have been made to use this type of device as a guard or shut-off control system for machines, such as to deactuate a machine should the operator insert his hands into an area which is dangerous. As an example, such a guard might be necessary for a punch press or forging or stamping press where it is desirable to cause the press to shut down at once and discontinue operation, should the operator's hands be in the press area during operation.

However, since the conventionally "electric eye" type of controls operate generally in the visible light range and require adjustments for ambient light compensation, controls must be provided for adjusting the operation of these devices from time to time. Thus, there is opportunity for inadvertently shutting off and operating without the control. In addition, these types of devices require accurate focusing of the light, with accurate alignment between the transmitter of light and the receiver and will not properly operate where there is misalignment or vibration or relative movement. Thus, they are not satisfactory for use as industrial optical type guards or controls particularly where mounting is upon a machine of the type which may move or have vibration or moving parts.

Thus, the invention herein relates to a light type of control for switches utilizing the principle of shining light from a transmitter to a receiver, but providing a curtain of light formed of numerous, intermittent, synchronously operated flashes of light beams, preferably of the non-visible light range. The control will signal a suitable switch for actuation thereof, whenever any one of the beams is interrupted. Moreover, the device is so made as to be relatively unaffected by misalignments, vibrations or small relative movements and generally is made "foolproof," i.e., without external controls which may inadvertently disconnect the system.

SUMMARY OF INVENTION

In general, the invention herein concerns a light control for a switch, which light is formed as a curtain made of intermittent, sequentially flashed, beams of light projected across a space between a pair of columns. The light is projected from a transmitter in one column to a receiver in a second column and then from a transmitter in the second column back to a receiver in the first column and so on until the last of the receivers in the columns receives its beam of light, at which point, the cycle is repeated. By rapidly repeating the cycle, for all practical purposes, there is almost a continuous "sheet" or curtain of light in the space between the columns. Upon interruption of any portion of the curtain, that is, the blockage of any of the beams, such as by inserting a physical object into the space, the failure of receipt of light by the particular receivers then involved, results in triggering a suitable switch.

Hence, it can be seen that the mechanism herein can be used as a guard for a machine or some other object to be guarded and will signal upon passage of any physical object into the space between the columns. By using light in the invisible range, the device is insensitive to ambient light as well as useful in situations where it is desirable to conceal the apparatus.

The invention herein further contemplates forming each of the columns with a physically aligned row of a pair of transmitters, a pair of receivers, a pair of transmitters, etc., but connecting the transmitters and receivers of each pair into two electrically connected rows. Thus, the receivers and transmitters are physically arranged in one row but electrically connected into two rows, such as an odd and even row. Switching mechanism is provided for sequentially operating first one row and then the other. With this arrangment, the beam of light may be relatively wide and non-sharply focused since it may shine upon not only a particular receiver expecting it but also the adjacent receiver and transmitters above and below it without affecting operation. For example, by spacing the transmitters and receivers on 1 inch centers, a beam of light of approximately 5 inches in height, centered upon the receiving receiver will not adversely affect operation. This means that the alignment of the receivers and transmitters are not critical and there is room for considerable misalignment. Also, vibration of the columns relative to each other, as for example, when mounted upon relatively moving or vibrating machine parts, will generally have no affect upon the operation of the control.

The spread of the light beam, may be increased by arranging the receivers and transmitters by threes or by fours, etc., as well as by twos, but for most general purposes of the device herein, the arrangement in pairs is the most practical and economical one.

The invention herein also contemplates what is believed to be a novel transmitter circuit arrangement and a novel receiver circuit arrangement as well as certain controls for timing and responding to the intermittent flashes of light beams. These will be discussed in greater detail in the description below.

These and other objects and advantages of this invention will become apparent upon reading the following description, of which the attached drawings form a part.

DETAILED DESCRIPTION

Figure 1:
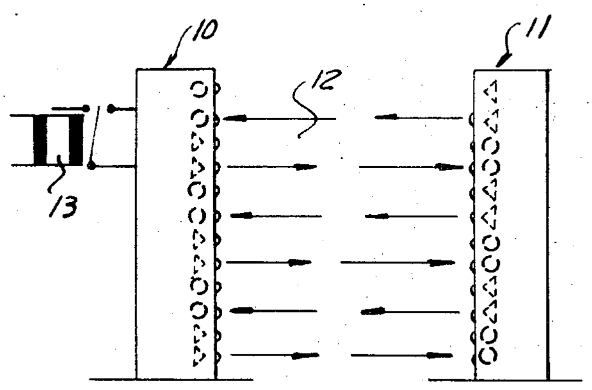
FIG. 1 is a schematic view of the control columns and light curtain arrangement.

Referring to FIG. 1, the light control generally consists of a pair of spaced apart columns or towers 10 and 11 between which is a "curtain" of light 12 formed of synchronized, momentary flashes of light beams travelling back and forth between the two towers or columns. Interruption of the light curtain 12, as by inserting a physical object between the columns, causes a relay switch 13 to actuate. The columns may be spaced apart a distance from a foot or less up to a number of feet, as for example, 6 feet or more. The switch 13 may be used as a power on/off control switch for a machine, such as a forging or press type machine for shutting it off in the event the operator's hands extend into the light curtain.

Figure 3:
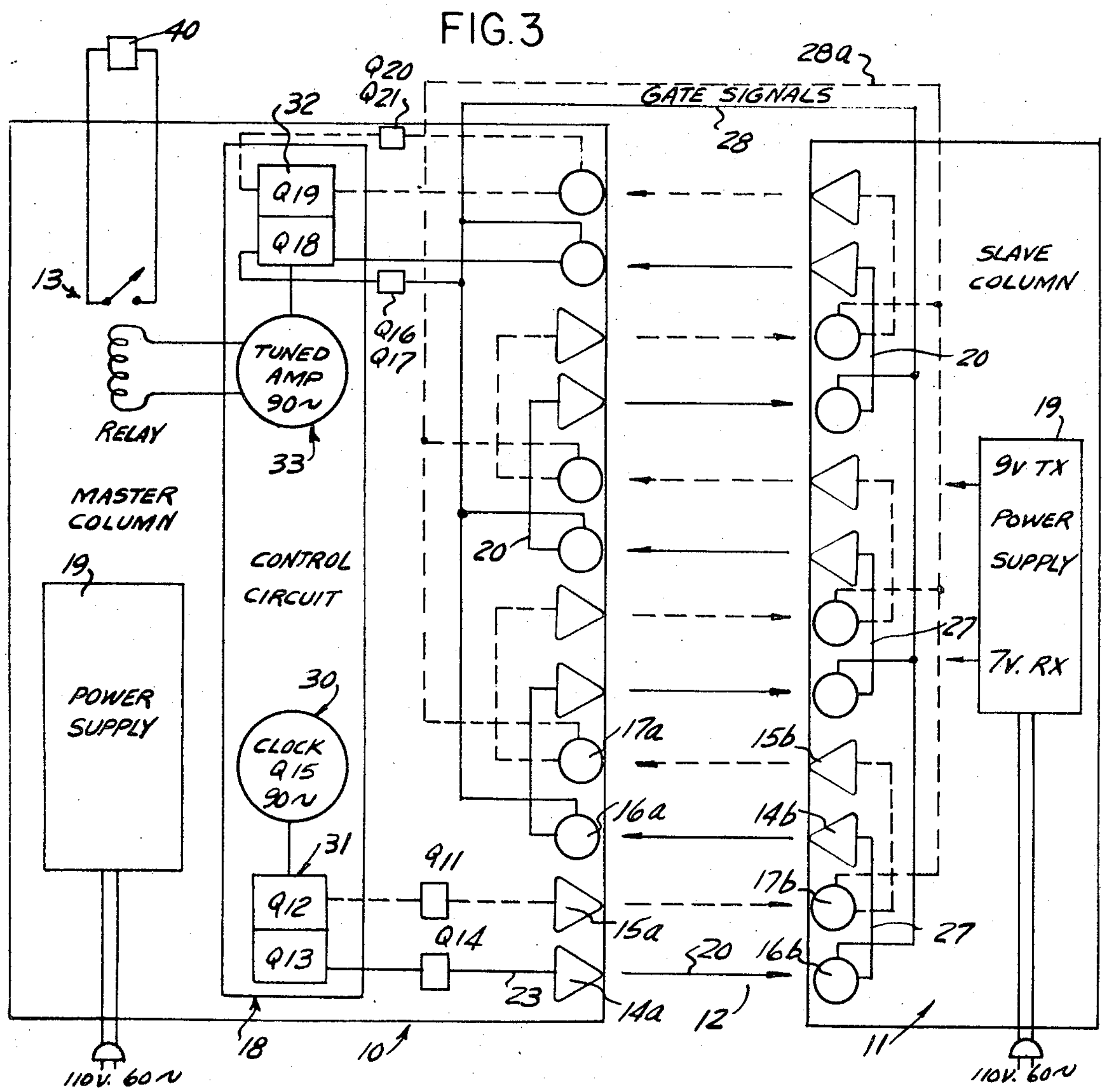
FIG. 3 is a schematic diagram of the column arrangement of the transmitters and receivers and related parts.

Referring to FIG. 3, which is a schematic drawing of the complete apparatus, each column includes a row of aligned light emitters and receivers. Thus, column 10 includes a line of transmitters or emitters 14*a* and 15*a*, above which are a pair of light receivers 16*a* and 17*a*, and so forth. Correspondingly, column 11 is also provided with pairs of light receivers 16*b* and 17*b*, above which are light emitters or transmitters 14*b* and 15*b*. As can be seen, the transmitters in one column are aligned horizontally with the receivers in the opposite column.

Although the transmitters and receivers are physically arranged in a single row in each column, each row is electrically connected into rows of odds and evens. As will be described below, the electrically connected even rows operate first, and then a switching means switches operations to the odd rows.

The general operation comprises the transmitter 14*a* in column 10 flashing a light beam across to its opposing receiver 16*b* which in turn signals the next highest light transmitter 14*b* to return a light beam back to receiver 16*a* in column 10 and so on back and forth until the even columns have finished transmitting and receiving their beams, at which point a switching mechanism repeats the transmission of light between the odd numbered transmitters and receivers, then recycles back to the even numbered transmitters and receivers and so forth.

The rapid flashing of light beams back and forth across the space between the columns, such as on the order of a 400 microsecond beam gapped by a 10 millisecond interval, and preferably in the non-visible light range, as for example, 9,000 Angstroms provides what is referred to here as a curtain of light between the two columns.

Column 10 is considered as the master column and carries a control circuit 18 and a power supply 19. Column 11 is considered as a slave column having only a power supply 19 similar to the master column supply.

The transmitters are all identical, as are the receivers, and will be separately described below in connection with FIGS. 4 and 5 respectively. The power supplies for these will be described in connection with FIGS. 6 and 7. The control circuit 18 is schematically illustrated in FIG. 8, which will be described below.

TRANSMITTER CIRCUIT

Figure 4:
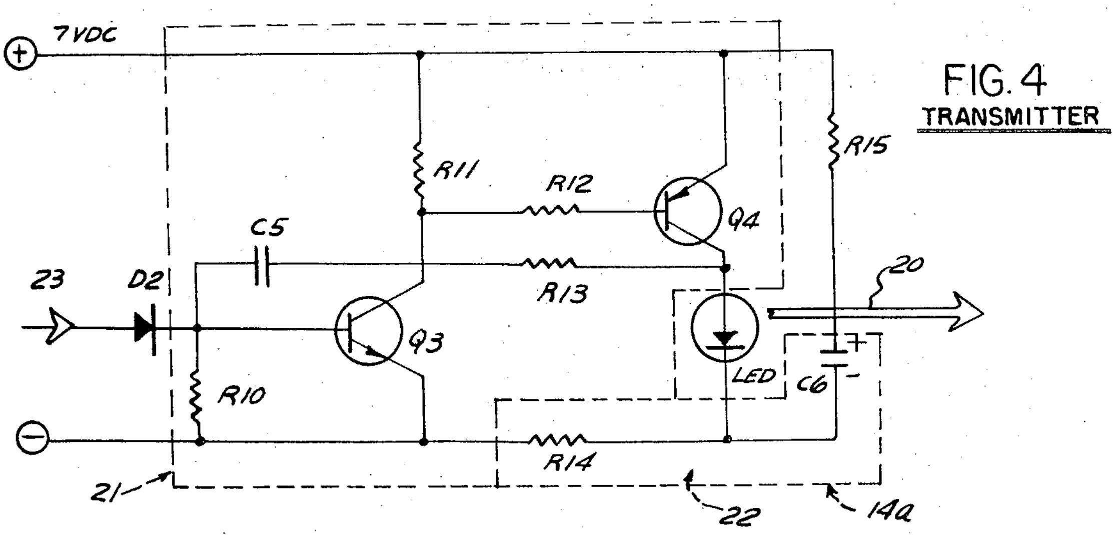
FIG. 4 is a schematic circuit diagram representing the construction of each of the transmitters.

As illustrated in the schematic circuit diagram in FIG. 4, each transmitter consists of three parts, namely, an infra-red emitting diode (LED) which transmits a light beam, designated by the arrow 20, a timing circuit part 21 and charging and storage circuit part 22.

The timing circuit part is formed of transistors $Q_3$ and $Q_4$ which together form a so-called one-shot, multivibrator, in which transistor $Q_4$ closes or passes a signal for a short time before it returns to its normally opened, non-operative state. As an example, it may be on the order of 300–400 microseconds. The timing of the operation is governed by a capacitor $C_5$ plus resistors $R_{13}$, $R_{10}$, together with transistor $Q_3$ which form an RC timing network. Essentially, the resistor $R_{13}$ and capacitor $C_5$ determine the time of operation.

Referring to the transmitter 14*a*, the first transmitter in the master column 10, a starting pulse (see arrowhead) is received through connecting line 23 from the control circuit. The pulse travels through a steering diode $D_2$ to the timing circuit and its D.C. coupled transistors $Q_3$ and $Q_4$ and including their load resistors $R_{11}$ and $R_{12}$ (for transistor $Q_3$) and resistor $R_{15}$ (for transistor $Q_4$). This causes the transistors $Q_{13}$ and $Q_{14}$ to turn on for a period of approximately 400 microseconds or so, as generated by the time constant $C_5$, $R_{13}$. A large current then flows through the infra-red emitting diode (LED) supplied from the charge and storage part capacitor $C_6$, whose resistor $R_{14}$ serves to recharge the capacitor $C_6$ between pulses.

The emitting diode (LED) then fires its light out through a window, towards the opposing receiver 16b. In the circuit shown, LED may draw an average 100 milliamp current, but peaks, when it transmits, at about 3 amps. Hence, capacitor $C_6$ stores current for the pulse and gives a heavy (i.e., 3 amp) pulse to LED. That current or pulse is limited to the 3 amp or so amount by resistor $R_{15}$. After firing its light signal, capacitor $C_6$ charges back through its resistor $R_{14}$, acting as an RC charging network and smoothing out the charge over the time between pulses.

Summarizing, each light emitting diode flashes a momentary beam of infra-red light, for a predetermined short period of time, when its circuit receives a triggering pulse through the steering diode $D_2$. The circuit is powered by a 7 volt power supply which will be described later.

THE RECEIVER

Each receiver circuit comprises essentially of two parts, namely, a light receiver and amplifier part 25 coupled to a pulse generator part which sends out a triggering pulse to the next emitter in the electrically connected line upon receipt of a light signal in the receiver-amplifier part.

The receiver-amplifier part includes an NPN phototransistor (LD1) which receives a flash of light 23 through its conventional window construction. It is connected to a transistor $Q_1$ as a D.C. coupled complementary amplifier. Resistor $R_3$ acts as the collector load for LD1 and resistor $R_4$ and $R_5$ are load resistors for $Q_1$.

Capacitors $C_1$ and $C_3$ set the high frequency of operation and capacitor $C_2$ sets the low frequency so that between them they set a range for operative frequency or give a broad band pass. An example of the band pass is 10 kiloherz plus or minus. The resistors $R_4$ and $R_5$ are center tapped to provide D.C. stabilization of feedback.

The base bias of LD1 is set by the voltage divider resistors $R_1$ and $R_2$.

The circuit operates off a nine volt, or more accurately 8.5 volt D.C. power supply which will be described later.

The receiver-amplifier is coupled through a capacitor $C_4$ to the pulse generator part 26. Thus, a pulse from the amplifier, i.e., a 400 microsecond pulse which is related to the light pulse, is transmitted to a unijunction transistor $Q_2$. Between the unijunction transistor and the capacitor $C_4$ are arranged a temperature stabilization diode $D_1$ and a fixed resistor $R_7$ plus a variable resistor $R_6$ which adjusts the threshold level of firing of the unijunction transistor. The purpose of these is to compensate for differences in thresholds in commercially available unijunction transistors. Thus, these are necessary to the operation only for the purpose of adjusting or tuning a commercial transistor, but are not theoretically necessary.

The unijunction transistor is provided with base load resistors $R_8$ and $R_9$, with resistor $R_9$ generating the voltage across the transistor which otherwise lacks resistance to generate a voltage across it. $R_8$ limits the current to the transistor.

A gating voltage G is applied across the unijunction transistor from the control circuit through the connecting wire 28. Above a certain threshold, the gating voltage G will prevent the unijunction transistor from firing and will effectively block signals therefrom. Below that voltage of the gating signal, the unijunction transistor will fire at a predetermined level which is set by the resistor $R_6$ and produce an output pulse through the connector 27 which is connected to the next transmitter in its column (i.e., receiver 16*b* is connected by wire 27 to transmitter 14*b;* see FIG. 3).

Figure 5:
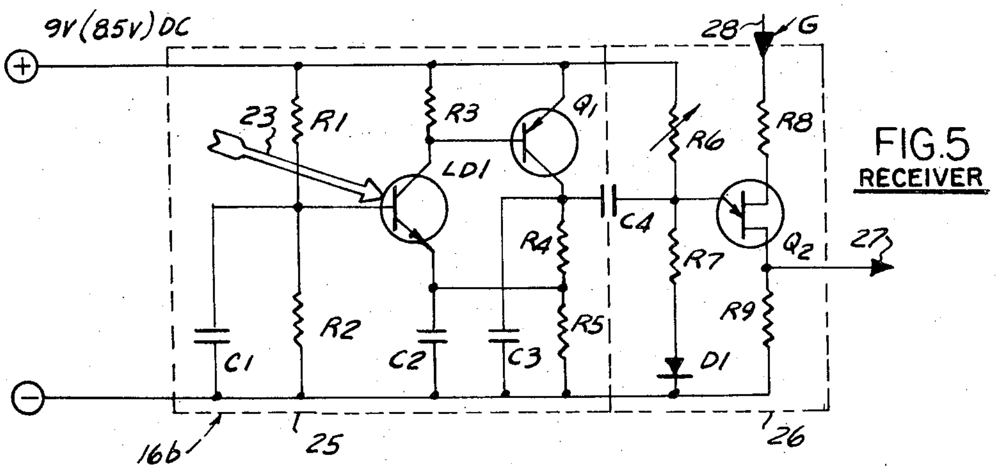
FIG. 5 is a schematic circuit diagram representing the construction of each of the receivers.
Figure 6:
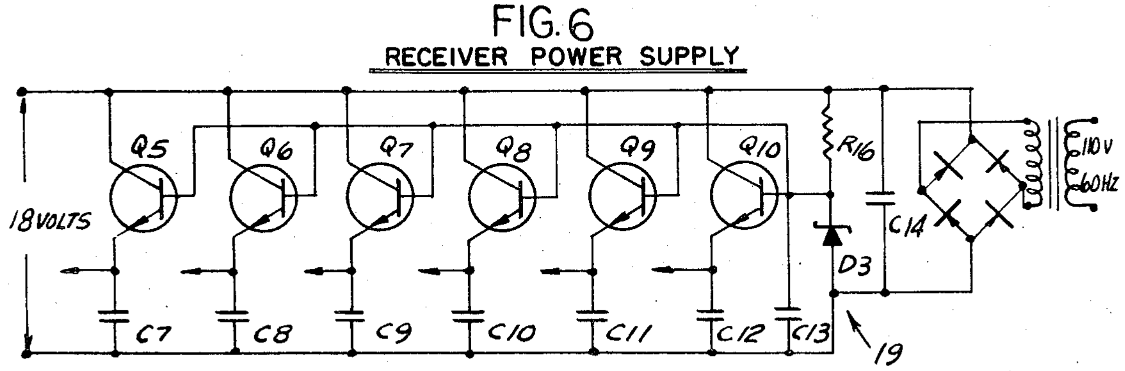
FIG. 6 schematically illustrates the simplified power supply system for the receivers.

Summarizing, the uppermost base of the unijunction transistor (as illustrated in FIG. 5) functions as a "gate" or is responsive to an incoming voltage which blocks firing of the unijunction transistor pulse through the connector 27. When the unijunction transistor receives a signal through capacitor $C_4$ and at the same time a variance in its gate voltage, at that time only it will fire its pulse to the next transmitter.

After the unijunction transistor fires, it becomes passive and remains so until it again receives simultaneously the pulse from the receiver-amplifier portion of the circuit and also the gate signal from the control circuit, that is, a lowered gate voltage, for again signalling.

As an example of operation, if the gate voltage is high as for example 20 volts, then the threshold voltage at the coupling capacitor $C_4$ is 10 volts or more and since the pulse coming in from the amplifier cannot exceed 9 volts (the power supply voltage) no signal can go into the unijunction transistor so that it does not transmit its signal pulse through connector 27. Conversely, when the gate volt drops to, for example, 10 volts, the threshold voltage at $C_4$ is at 5 volts, thus permitting a signal coming from the amplifier to pass to the unijunction transistor which in turn will fire its pulse and then become passive again.

POWER SUPPLIES

The power supply system is arranged to utilize a conventional 110 volt, 60 cycles A.C., which is readily available and to convert this into 18 volt, D.C. for the control circuit, plus nine volt D.C. (actually 8.5 volt) for the receiver circuit and 7 volt D.C. for the transmitters. Preferably, each receiver has its own power source. Thus, referring to FIG. 6, as is schematically shown, the 110 D.C. input is converted through a transformer and diodes into an 18 volt D.C. output for the control and separate 8.5 volt D.C. outputs for each of the receivers. The 9 volt output is accomplished through the approximately 9 volt zener diode $D_3$ combined with an NPN silicon transistor $Q_5$ through $Q_{10}$ for each receiver. This is a conventional type power circuit and similar purpose circuits may be sustituted.

Figure 7:
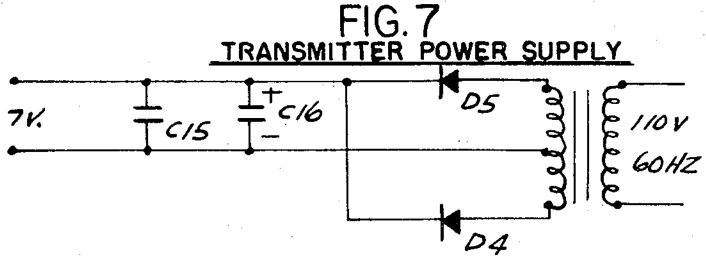
FIG. 7 illustrates the circuit diagram of the transmitter power supply.
Figure 8:
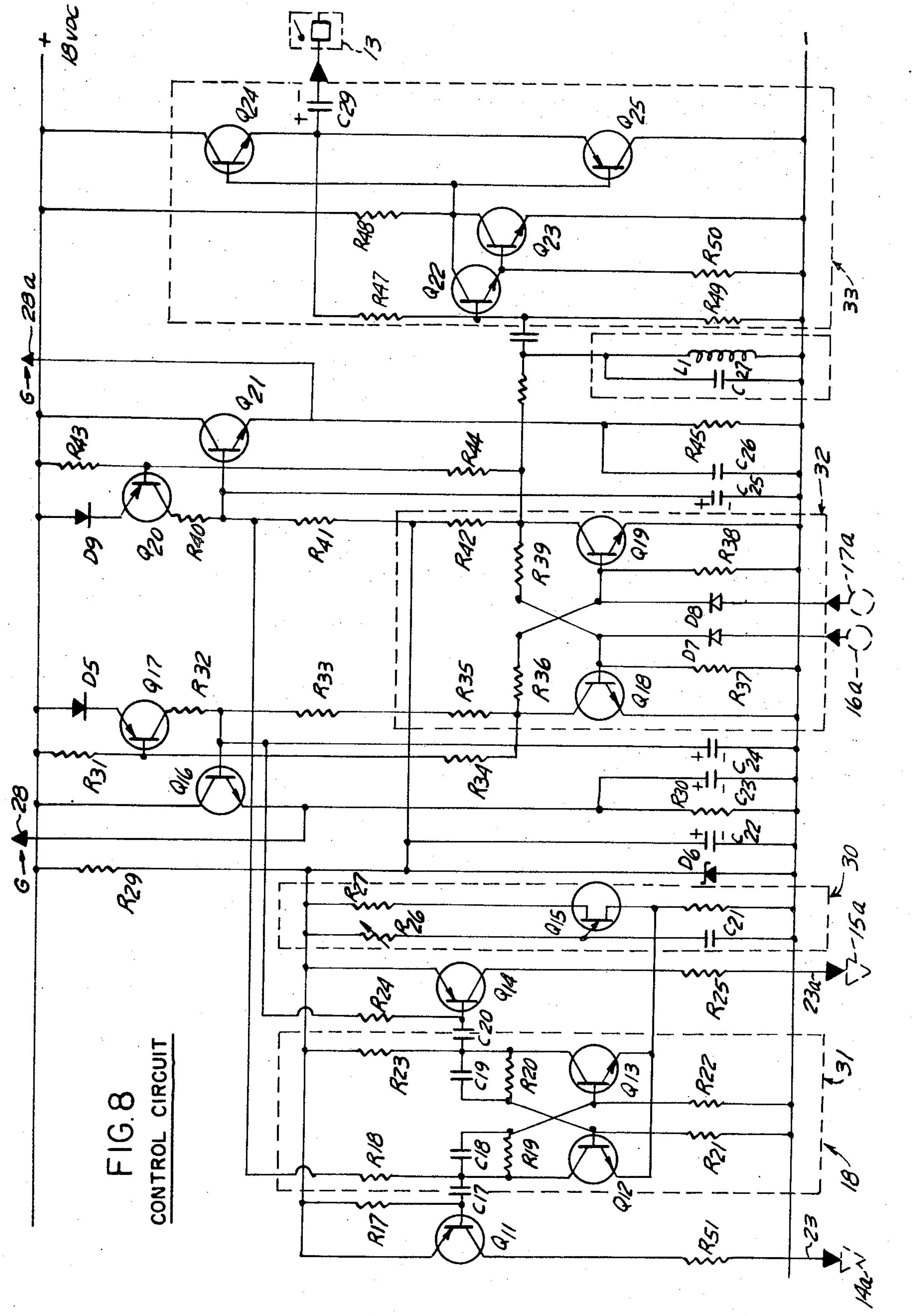
FIG. 8 is a schematic electrical circuit diagram showing the control and switching circuitry.

Likewise, for the transmitters, FIG. 7 illustrates a schematic circuit which converts, through a transformer, the 100 volt A.C. into 7 volt D.C. power supply. One such power supply may be connected to all of the transmitters, as contrasted to the receivers each having their own power supply for better operation.

In the receiver supply, the nine volt expected output is cut down by about one-half volt due to the transistors so that the actual supply to each receiver is approximately 8.5 volt D.C.

CONTROL CIRCUIT (FIG. 8)

Referring to FIG. 8, the schematic control circuit diagram, and also to FIG. 3, schematic layout, the control circuit begins with an oscillator or clock 30 which consists of a unijunction transistor $Q_{15}$. The clock generates pulses continuously at a fixed rate, which rate is determined by a variable resistor $R_{26}$ and a capacitor $C_{21}$. Transistor load resistors $R_{27}$ and $R_{28}$ are also provided in the circuit. The clock 30 operates a bistable binary 31 made up of transistors $Q_{12}$ and $Q_{13}$ whose output is differentiated through capacitors $C_{17}$ and $C_{20}$. Transistors $Q_{11}$ and $Q_{14}$ amplify the differentiated signals and supply narrow trigger pulses through resistors $R_{51}$ and $R_{25}$, through connector wires 23 and 23*a* to light transmitters 14*a* and 15*a*, respectively, these being the bottom two transmitters in column 10.

An upper binary or switch 32 is provided to switch the gate signals from the odd to even rows. This binary or switch receives input signals from the uppermost receivers 16*a* or 17*a* respectively, at the uppermost part of column 10 which impulses are applied through steering diodes $D_7$ or $D_8$ to the binary made of up transistors $Q_{18}$ or $Q_{19}$. This binary supplies a square wave output to gate signal amplifiers $Q_{20}$–$Q_{17}$ which are D.C. coupled amplifier transistors or alternatively, to transistors $Q_{16}$–$Q_{21}$, likewise coupled. The amplified gate signals are transmitted through connectors 28–28*a* as pulses "G" to the receivers in either the odd or even electrically connected rows as the case may be.

A second square wave signal is derived across resistor $R_{46}$ and applied across a tuned circuit consisting of capacitor 27 and inductor L–1 producing a sine wave passed through coupling capacitor 28 to the power amplifier 33 which is made up of transistors $Q_{22}$ through $Q_{25}$. In the amplifier, the capacitor $C_{29}$ removes the D.C. component from the output and the sine wave is then used to operate the switch or relay 13 which is controlled by the entire circuit. As illustrated in FIG. 3, the switch or relay 13 is connected to a suitable load or power system, as for example, the power shut off system of a machine so that when the relay 13 is actuated, the machine shuts off.

The tuned L-C circuit consisting of $C_{27}$ and $L_1$ is tuned to the clock frequency. Thus, there can only be an output at capacitor $C_{28}$ when the two binaries are synchronized. Thus, the amplifier circuit 33 will only receive or accept a sine wave signal from the clock circuit and no other signal is accepted. This is due to the tuned LC circuit which compares received signals with output signals and causes the system to reject any signal which is not from the clock. As a result of this arrangement, failure of any part of the system will cause a shut down of the system due to the tuned circuit.

The signal operated relay 13, receives the sine wave signal and stays closed as long as it receives a signal. Should the signal stop, that is, should the amplifier stop transmitting a signal, then the relay pops open. Thus, failure anywhere in the system, whether by blockage of a beam of light or an internal failure of the parts in the system, ultimately causes the relay 13 to open.

As an example of operation, if the light beam is interrupted as for example by a workman putting his hand into the curtain of light, the net result is no output from the uppermost transmitter which is then on the line in either the odd or even row, and thus, no input to the binary or switch 32, no input to the amplifier $Q_{22}$–$Q_{25}$ and consequently no signal output to the relay to hold it closed.

Likewise, whenever the tuned circuit $C_{27-L}$ is not synchronized with the clock, the system stops giving signals to the relay. The tuned circuit, in effect, acts as an insurance to make sure that all the circuit parts are in fact working as expected. The tuned circuit will sense something improperly working in the circuit and therefore makes it "failsafe."

SPREAD OF LIGHT BEAM

Figure 2:
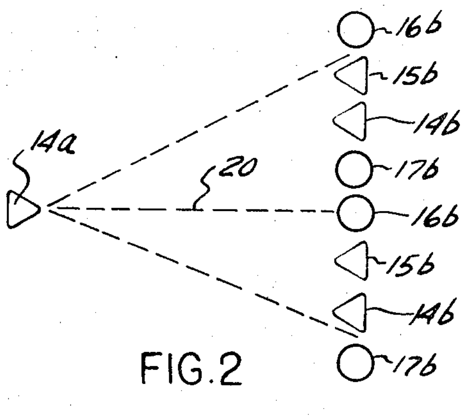
FIG. 2 is an enlarged view showing the spread and coverage of a light beam extending across the space or gap between the columns.

Going back to FIG. 2, it can be seen that the light beam momentarily transmitted from a transmitter (i.e., 14*a*) need not be accurately focused upon only one corresponding receiver in the opposite column (i.e., receiver 16*b*). For example, as illustrated in FIG. 2, the receiver 16*b* is momentarily in the actuated or on-line even column, at which time all of the receivers in the column are receiving the required gate signal and thus can respond to the receipt of light. However, the operable receivers are widely spread apart, separated by transmitters as well as inoperative receivers (in the odd column) so that the area of light play upon the column may cover not only the receiver for which it is designated, but also, at the moment, the inoperative transmitters and receivers in their column, thus permitting a wide spread of light. For example, if the parts are arranged one inch on center, the light spread can be five inches or so without affecting the operation of the control circuit.

This relatively non-sharp or non-focused light makes it possible to permit considerable misalignment of the two columns as well as to accommodate for vibration due to a vibrating mounting upon which the columns are placed, etc.

The system can be operated with single alternating transmitters and receivers, with pairs of same as illustrated on the drawings, or in triplets or in four parts, etc. The purpose of using the pairs of receivers and transmitters is to permit maximum light spread consistent with optimum and economical construction. Thus, a relatively cheap light source, with a relatively wide spread, can be used by using pairs of transistors and receivers in each column, without further complicating the electrical control system.

Having fully described an operative embodiment of this invention, I now claim:

1. A light controlled switch comprising:

a pair of spaced apart columns, each having a row of alternating light transmitters and receivers for momentarily flashing a beam of light directed from one transmitter in the first column to an opposing receiver in the second column, and then back from the next transmitter in the second column, to its opposing receiver in the first column and continuing throughout the row, with each receiver including circuit means for triggering the next transmitter upon receipt by that receiver of a light beam;

and electrical switch means for recycling the transmission of light by the first transmitter in the row upon receipt of a light beam by the last receiver of the rows, for continuously and rapidly repeating the cycles of light beam transmissions;

whereby the successive momentary flashes of light beams produce a curtain of light across the space between the two columns;

and a control circuit responsive to interruptions of any of said beams, as by insertion of a physical object into the curtain to block any of said beams from reaching its respective receiver, to actuate an electrical switch.

2. A construction as defined in claim 1, and wherein the light beam of each transmitter is focused to shine within the area of its opposite column encompassed by its respective opposing receiver and the transmitters located upon the opposite sides of that respective receiver, so that said light beam is relatively non-sharply focused.

3. A construction as defined in claim 1, and said transmitted light beam being in the non-visible wave length ranges, so that the light curtain is normally invisible.

4. A construction as defined in claim 1, and each column including a second row of alternating transmitters and receivers, each physically arranged in alignment with the first row, and interspersed between the transmitters and receivers of the first row to form alternating pairs of transmitters and receivers physically forming one row, but electrically connected to form two rows in each column;

and switching means to switch from one opposed set of rows in each column to the next opposed set of rows in each column each time the last of the receivers in the opposed set of rows receives a light beam, for thereby sequentially alternating operation of and hence, light beam transmissions and receipt of the two opposed sets of electrically connected rows;

and said light beams being relatively non-sharply focused to shine from each transmitter upon the opposite column area ranging above and below its opposed receiver and between the next adjacent receivers in the electrically connected row of that specific receiver;

and wherein light shined at that moment upon the next adjacent transmitters and the next physically adjacent receiver which is electrically connected to the next row, is ineffective upon the system, thereby permitting misalignment and relatively non-focused light beams to be used.

5. An electrical control comprising:

first and second spaced apart columns each formed of a number of aligned, alternating light emitters and light receivers arranged in pairs, that is, a pair of emitters, then a pair of receivers and so forth, with the emitters and receivers of each of the pairs in each column electrically connected together to form two rows, namely, an odd row and an even row of alternating emitters and receivers in each column, and with each emitter in each row of one column being generally aligned with a receiver in the corresponding row of the opposite column;

and row switch means for sequentially and cyclically, simultaneously operating the odd rows and then the even rows of both columns;

means for actuating each emitter to momentarily flash a light beam across the space between the columns towards its opposing receiver, which in turn includes signal means for actuating the next adjacent emitter in its row to momentarily flash a light beam back to its opposing receiver next adjacent to and in the same row as the first mentioned receiver so that momentary light beams are sequentially flashed back and forth between the emitters and receivers of corresponding opposing rows until the last receiver of such rows receives its light beam, at which point its signal means signals a row switch means and causes it to switch to the next corresponding rows of the columns;

with the sequential light emissions by the respective emitters of one row and then the next row being rapid and cyclically continued to form a curtain of light between the columns;

and electrical switching means for sensing the failure of receipt of light by any of said receivers in its proper sequence of light received, such as by blockage of said beam by a physical object placed in its path, and including a signal means for signalling the interruption of the light curtain;

whereby each emitter may shine its beam within the area covering the opposing receiver and between the adjacent receivers electrically connected within the same row of said opposing receiver, that is, it may shine upon the receiver physically adjacent to, but electrically connected to a different row than the said opposing receiver, as well as upon the pairs of emitters adjacent to the opposite sides of and in the same column as said opposing receiver, without adversely affecting operation of the system so that each light beam may be relatively broad and non-sharply focused and the opposing receivers and emitters may be slightly misaligned and may move relative to each other.

6. An electrical control as defined in claim 5, and including a switch connected to received and operated by the interruption signal from said signal means, whereby the control may sense physical movement of objects through said curtain of light and operate said switch upon sensing such movement.

7. A device as defined in claim 5, and including:

an oscillator which continuously generates pulses at a predetermined fixed rate, a binary switch connected to the receivers in both columns for receiving said oscillator pulses and generating and alternatingly transmitting a timed gate signal to all the receivers in one row of one column and then to the receivers in the corresponding row of the other column;

a second binary switch for switching the timed gate signals from the receivers in the second corresponding rows of both columns after the last of the receivers in the first mentioned corresponding rows has received its beam of light;

and the secondary binary switch being coupled to and passing a signal from the first binary switch to an amplifier which supplies current to an electrical control switch;

said binary switches being synchronized to a tuned circuit which is tuned to the oscillator frequency wherein upon failure of synchronization of the switches, the signal to the amplifier is blocked, thus blocking the signal to the control switch which is thus actuated.

* * * * *